US010263707B2

(12) United States Patent
Sadagopan et al.

(10) Patent No.: US 10,263,707 B2
(45) Date of Patent: Apr. 16, 2019

(54) ELECTRO-OPTICAL MODULATOR WITH DIFFERENTIAL BIAS CONTROL

(71) Applicant: Intel Corporation, Santa Clara, CA (US)

(72) Inventors: Thiruvikraman Vikram Sadagopan, Fremont, CA (US); Sang Yup Kim, Sunnyvale, CA (US); Jen-Chyun Chen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/753,121

(22) PCT Filed: Sep. 22, 2015

(86) PCT No.: PCT/US2015/051545
§ 371 (c)(1),
(2) Date: Feb. 15, 2018

(87) PCT Pub. No.: WO2017/052520
PCT Pub. Date: Mar. 30, 2017

(65) Prior Publication Data
US 2018/0241474 A1    Aug. 23, 2018

(51) Int. Cl.
*H04B 10/50* (2013.01)
*G02F 1/01* (2006.01)
*H04B 10/564* (2013.01)

(52) U.S. Cl.
CPC ..... *H04B 10/50575* (2013.01); *G02F 1/0123* (2013.01); *H04B 10/564* (2013.01)

(58) Field of Classification Search
None
See application file for complete search history.

(56) References Cited

U.S. PATENT DOCUMENTS

| 7,986,885 B2* | 7/2011 | Mamyshev | G02F 1/0123 398/188 |
| 9,020,361 B2* | 4/2015 | Kawakami | G02F 1/0123 398/188 |

(Continued)

FOREIGN PATENT DOCUMENTS

JP    2014010189 A    1/2014

OTHER PUBLICATIONS

Luxtera, "Hybrid Silicon Photonics for High-Speed Optical Interconnect," Jul. 24, 2014, 24 pages.

(Continued)

*Primary Examiner* — Sung H Pak
(74) *Attorney, Agent, or Firm* — Schwabe, Williamson & Wyatt, P.C.

(57) ABSTRACT

Embodiments of the present disclosure are directed toward techniques and configurations for an apparatus comprising an electro-optical modulation device with a bias control and adjustment. In some embodiments, the apparatus may comprise an electro-optical modulator having first and second arms, to modulate light passing through the first and second arms in response to an input data signal, and output a corresponding optical data signal. The apparatus may further comprise a control module coupled with the electro-optical modulator, to differentially adjust respective phases of first or second light portions passing through the first and second arms, to achieve a bias point for the optical data signal. The bias point may define a desired power output of the apparatus that corresponds to the optical data signal. Other embodiments may be described and/or claimed.

19 Claims, 7 Drawing Sheets

(56) References Cited

U.S. PATENT DOCUMENTS

| | | | |
|---|---|---|---|
| 2001/0007508 A1* | 7/2001 | Ooi | G02F 1/0123 |
| | | | 359/245 |
| 2002/0005975 A1* | 1/2002 | Nakamoto | G02F 1/0121 |
| | | | 359/254 |
| 2004/0028418 A1* | 2/2004 | Kaplan | G02F 1/225 |
| | | | 398/188 |
| 2008/0080872 A1* | 4/2008 | Tanaka | H04B 10/505 |
| | | | 398/186 |
| 2009/0238510 A1 | 9/2009 | Kawanishi et al. | |
| 2010/0232737 A1 | 9/2010 | Sugiyama et al. | |
| 2011/0135319 A1 | 6/2011 | Youn et al. | |
| 2013/0142521 A1 | 6/2013 | Dispenza et al. | |
| 2016/0156418 A1* | 6/2016 | Yamanaka | H04B 10/564 |
| | | | 398/38 |
| 2017/0117961 A1* | 4/2017 | Yoneyama | H04B 10/50575 |
| 2018/0059445 A1* | 3/2018 | Miyazaki | G02B 6/12 |

OTHER PUBLICATIONS

International Search Report and Written Opinion dated Jun. 29, 2016 for International Application No. PCT/US2015/051545, 9 pages.

* cited by examiner

ELECTRO-OPTICAL MODULATOR WITH DIFFERENTIAL BIAS CONTROL

CROSS REFERENCE TO RELATED APPLICATIONS

The present application is a national phase entry under 35U.S.C. § 371 of International Application No. PCT/US2015/051545, filed Sep. 22, 2015, entitled "ELECTRO-OPTICAL MODULATOR WITH DIFFERENTIAL BIAS CONTROL", which designated, among the various States, the United States of America. The Specifications of the PCT/US2015/051545 Application is hereby incorporated by reference.

FIELD

Embodiments of the present disclosure generally relate to the field of optical data communication, and more particularly, to techniques and configurations for differential bias control in electro-optical modulation devices, such as Mach-Zehnder modulators.

BACKGROUND

Electro-optical modulation devices, such as Mach-Zehnder interferometer (MZI), e.g., modulators, may often be used to modulate optical signals at high-speed data transmission. Fabrication of the electro-optical modulation devices may introduce variations in the optical components, including dimensions of optical structures, laser characteristics, physical lengths of the arms of the electro-optical modulation devices, and the like. Furthermore, during operation, e.g., data transmission, additional variations may be introduced, which may negatively affect quality of data transmission.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure describe techniques and configurations for an apparatus comprising an electro-optical modulation device with a bias control and adjustment. In some embodiments, the apparatus may comprise an electro-optical modulator having first and second arms, to modulate light passing through the first and second arms in response to an input data signal, and output a corresponding optical data signal. The apparatus may further comprise a control module coupled with the electro-optical modulator, to differentially adjust respective phases of first or second light portions passing through the first and second arms, to achieve a bias point for the optical data signal. The bias point may define a desired power output of the apparatus that corresponds to desired (e.g., greatest) electrical to optical modulation efficiency of the data signal.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
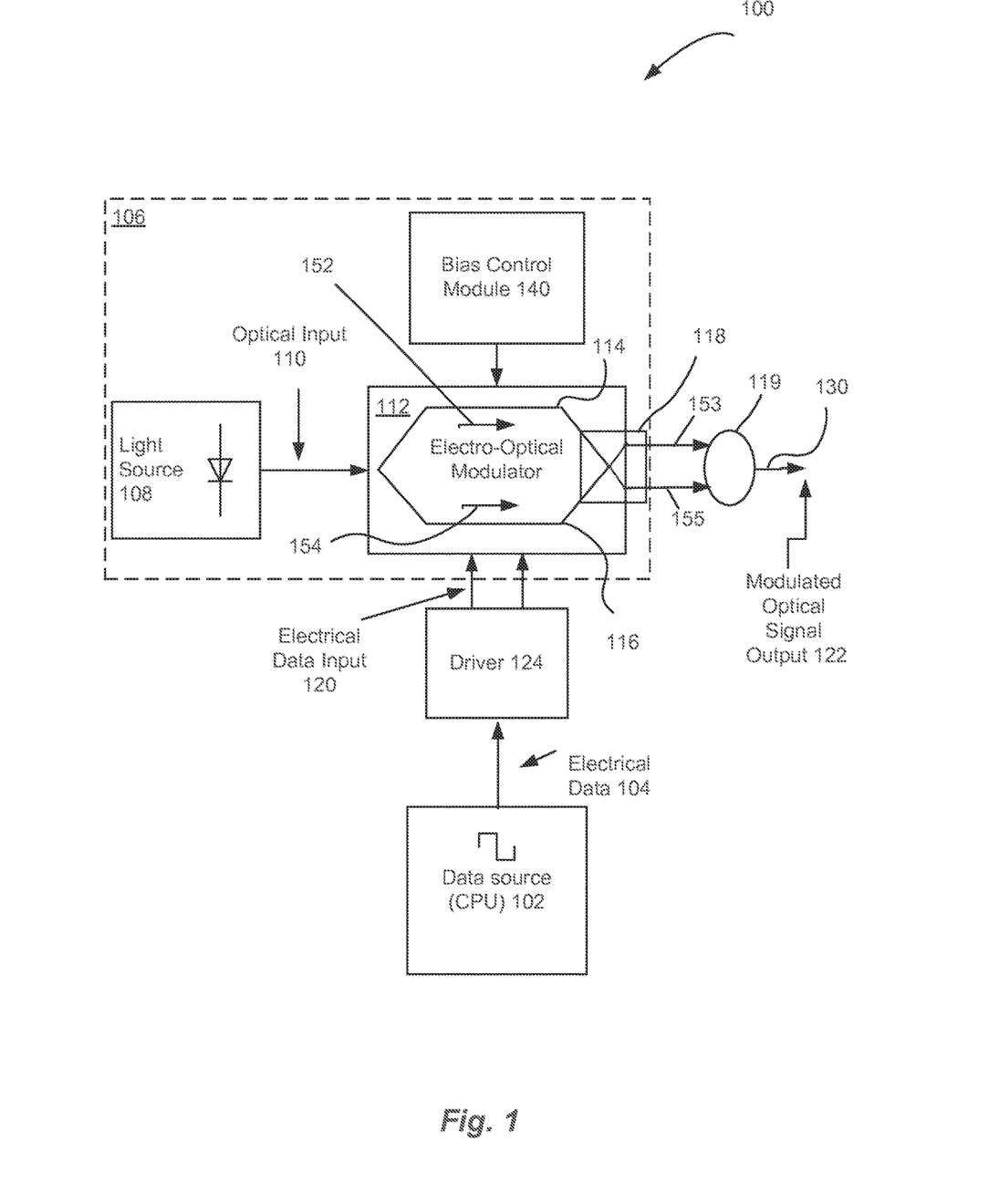
FIG. 1 is a block diagram of an example apparatus that may include an electro-optical modulator with a differential bias control and adjustment of the present disclosure, in accordance with some embodiments.

FIG. 1 is a block diagram of an example apparatus that may include an electro-optical modulator with a differential bias control and adjustment of the present disclosure, in accordance with some embodiments. In some embodiments, the apparatus 100 may comprise a computing device configured with an electro-optical modulation device described herein. The apparatus 100 may include a data source 102, such as a central processing unit (CPU), a router (e.g., with Internet traffic), a graphics chip, and the like. The data source 102 may be configured to generate and/or process data 104 to be provided to another apparatus via a communication interface, such as communicated by a transmitter 106, whose components will be described herein in greater detail. More generally, the apparatus 100 may include an input from any data source that may provide data 104, to be transmitted by the apparatus 100.

As shown, the transmitter 106 may include a light source (e.g., laser) 108 configured to provide optical input (light) 110 into an electro-optical modulator 112 that may be coupled with the light source 108. As will be described below in greater detail, the electro-optical modulator 112 may be an MZI, for example.

The electro-optical modulator 112 may include a first arm 114 (e.g., upper arm) and a second arm 116 (e.g., lower arm) configured to pass respective light portions 152, 154 of light 110 input from the light source 108.

The electro-optical modulator 112 may be configured to modulate light portions 152, 154 passing through the first and second arms 114, 116 according to an electrical data input 120 provided to the electro-optical modulator 112, to combine first and second light portions 152, 154 of the first and second arms 114, 116 respectively within an optical coupler 118, to produce two complementary output arms 153, 155 that result from constructive and destructive interference of light portions 152, 154, such that one output arm may reproduce an optical data signal 122 from the electrical data input 120 while the other arm may reproduce its complement, and further configured with a structure 119 that may contain a transmit window or facet for the optical power from output arm that reproduces the data signal for eventual coupling to an optical fiber 130 and may also contain an absorptive beam dump for the optical power from the complementary output arm.

The data source 102 may be coupled with a driver 124. The driver 124 may be configured to receive data 104 from the data source 102 and provide electrical data input 120 to first and second arms 114, 116, in order to drive modulation of light portions 152, 154 in the first and second arms 114, 116 according to the data 104. The resulting modulated optical signal output 122 may be provided to a recipient device, e.g., via an optical fiber cable 130, or other optical solution such as a waveguide.

In some instances, the phases of the light portions 152, 154 passing through the first and second arms 114 and 116 of the electro-optical modulator 112 may be offset from each other. There may be several reasons for phase offsets between the light portions 152, 154 passing through the first and second arms 114, 116. For example, imperfections of dimensions of optical components of the transmitter 106 may define a fixed or initial phase offset. The initial phase offset may affect a desired power output of an electro-optical modulator, such as 112. The power output may be further affected by external conditions, such as ambient factors. For example, the optical components of the transmitter 106 may be temperature sensitive.

In embodiments described herein, the apparatus 100 may be configured to maintain a half-intensity transmission point (e.g., $\pi/2$ bias point or quadrature point, hereinafter "bias point") that defines a desired power output of the data signal 130 of the electro-optical modulator 112 resulting from a combination of light portions 152, 154 in the first and second arms 114, 116, to compensate for offset from the bias point due to sensitivity to temperature and instability of optical components that may cause the bias point to drift over time.

More specifically, the apparatus 100 may include a bias control module 140 coupled with the electro-optical modulator 112. The bias control module 140 may be configured to differentially adjust respective phases of the first and second light portions 152, 154 passing through the first and second arms 114 and 116, using differential adjustment of respective bias currents provided to arms 114 and 116, to achieve a bias point and to dynamically compensate a drift of the bias point caused by ambient factures (e.g., temperature), in order to maintain the achieved bias point. These and other aspects will be further described with references to the remaining Figures.

Figure 2:
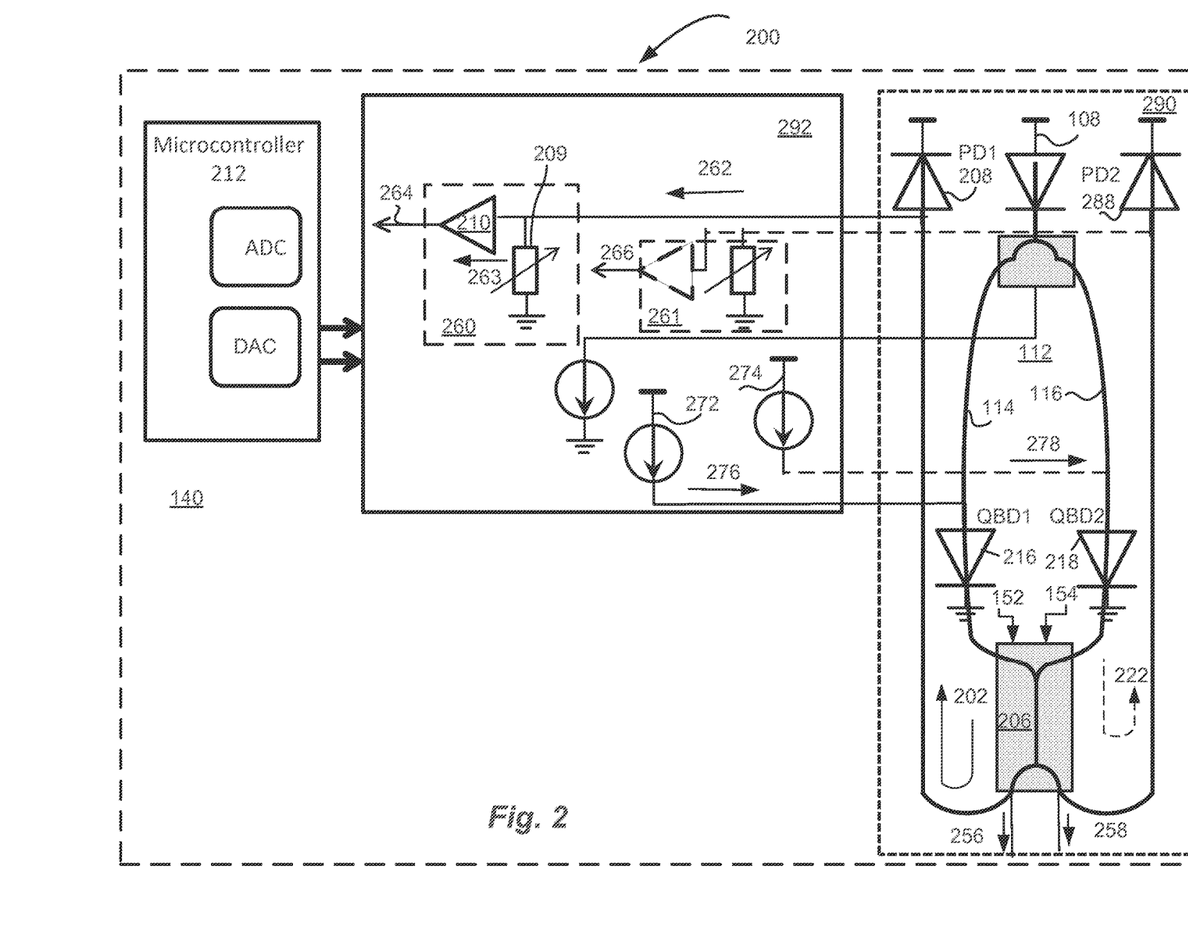
FIG. 2 is a block diagram of an example apparatus having an electro-optical modulator with a differential bias control and adjustment illustrated and described in more detail, in accordance with some embodiments.

FIG. 2 is a block diagram of an example apparatus having an electro-optical modulator with a bias control module to provide differential bias control and adjustment, illustrated and described in more detail, in accordance with some embodiments. Some of the components of the apparatus 200 may correspond to the components of the apparatus 100 described above and are numbered with like numerals for purposes of description.

The electro-optical modulator 112 of the apparatus 200 may comprise an MZI having a light source (e.g., laser) 108, the first arm 114 including a bias diode QBD1 216, and the second arm 116 including a bias diode QBD2 218. The bias control module 140 (shown in dashed lines) of the apparatus 200 may be coupled with the electro-optical modulator 112 to provide differential bias control and adjustment as described herein. The bias control module 140 may include a feedback loop having a first feedback tap portion 202 and a second feedback tap portion 222 (shown in dashed lines), configured to control a phase offset between the portions of light in first arm 114 and second arm 116 of an electro-optical modulator 112 in order to maintain the bias point. For purposes of description, the feedback tap portion 202 associated with the first arm 114 is described herein in greater detail. It will be appreciated that the feedback tap portion 222 associated with the second arm 116 may include the components similar to those discussed in reference to the first feedback tap portion 202, some of which are shown in FIG. 2.

The light portions 152, 154 may be outputted by the first arm 114 and second arm 116 of the electro-optical modulator 112 to a coupler 206. As shown, the coupler 206 may be coupled with the first arm 114 and second arm 116 via two corresponding inputs. The coupler 206 may be configured to convert the first and second light portions 152, 154 into first and second power signals 256, 258 indicative of respective phases of the first and second light portions 152, 154.

The two outputs of the coupler 206 may be positioned to be substantially out of phase with each other so that when light is minimized on one output, it may be maximized on the other output. The power signals 256 and 258 may be provided for further processing to the components of the first and second feedback tap portions 202, 222.

The coupler 206 may be coupled with photodiodes PD1 208 and PD2 288. The photodiode PD1 208 may be configured to receive the optical power signal 256 from the coupler 206 and to generate a photocurrent signal 262 corresponding to the power signal 256. (Similarly, the photodiode PD2 288 may be configured to receive the optical power signal 258 from the coupler 206 and to generate a photocurrent signal (not shown) corresponding to the power signal 256.) The photodiodes PD1 208, PD2 288 may be biased under reverse polarity (i.e., cathode voltage higher than anode voltage) to produce photocurrents proportional to the absorbed optical power.

The resulting photocurrents (e.g., optically-generated current 262) may be passed to a converter 260 of the bias control module 140, specifically, to a respective sense resistor 209, which may convert the current 262 to a corresponding voltage signal 263. The converter 206 may also include an amplifier 210 coupled with the sense resistor 209 and configured to amplify the voltage signal 263 to a voltage signal 264, e.g., to provide a voltage signal 264 that is above a voltage sense threshold. (A converter 261 similar to converter 260 described above may be included in the second loop portion 222, as shown in FIG. 2, but not described herein for simplicity purposes.)

The amplifier 210 may be coupled to a processing unit of the bias control module 140, such as a microcontroller 212. The microcontroller 212 may be configured to receive the voltage signal 264 (and corresponding voltage signal 266 from the second feedback tap 222), convert that voltage to a digital value through an analog-to-digital-converter (ADC), compare that digital value against a target value, and generate bias current values for differential adjustment of phases of light portions passing through first and second arms 114 and 116 of the electro-optical modulator 112. The microcontroller 212 may provide the bias current values via a digital-to-analog converter (DAC) to respective current source circuits 272 and 274 coupled with the microcontroller 212.

The current source circuit 272 may be coupled with the electro-optical modulator 112 and configured to generate a bias current 276 corresponding to the value provided by the controller 212. The generated bias current 276 may be injected into the bias diode QBD1 216 of the first arm 114 of the electro-optical modulator 112 to achieve the bias point. Similarly, the current source circuit 274 may be coupled with the second arm 116 of the electro-optical modulator 112 and configured to generate a bias current 278 corresponding to the value provided by the controller 212, which may be injected into the bias diode QBD2 218 of the second arm 116.

Injecting bias current of determined values according to differential adjustment techniques (discussed below) into both arms 114, 116 may change the index of refraction of both arms, which may result in the phase adjustment of the respective arms, to achieve and maintain the bias point.

The components of the apparatus 200 may be categorized into optical devices and electrical devices. The optical devices, such as the electro-optical modulator having arms 114 and 116, the coupler 206, photodiodes PD1 208 and PD2 280, optical paths between these components (not shown), and corresponding components of the feedback loop 222 may be integrated on a semiconductor die, e.g., in a silicon microchip 290.

More generally, silicon photonics and/or other advanced device fabrication technologies may enable the integration of at least optical components of the apparatus 200 onto the same device. Integration of optical components may ensure that optical devices such as, for example, photodiodes PD1 208 and PD2 288 may perform similarly because they may comprise the same semiconductor material and, therefore, may be characteristically similar. Accordingly, inherent errors that may be introduced during fabrication of the apparatus 200 due to connections (e.g., optical loss due to coupling of different optical devices) or differences in semiconductor properties may be minimized. Due to optical component integration described above, fewer circuit components (assembled into an integrated circuit 292) may be required to implement the control module 140, compared to existing solutions.

As described above, the phase of the optical modulated signal of an electro-optical modulator (e.g., MZI) may defined by a natural (initial) offset of the phase of the electro-optical modulator and any additional phase on each arm:

$$\phi = \phi_{offset} + \phi_1 - \phi_2$$

where $\phi_{offset}$ is the natural (initial) offset of the output signal (e.g., intrinsic phase value under zero bias current on each of the bias diodes), $\phi_1$ is induced phase on a first (e.g., upper) arm of the MZI, and $\phi_2$ is induced phase on a second (e.g. lower) arm of the MZI.

As described above, phases in each arm may be induced by injecting electrical current into the bias diode QBD of a respective arm. For small to moderate bias currents, the relationship between the phase change versus bias current can be expressed by a series expansion approximation:

$$\phi_1 = \alpha \cdot I_1 + \beta \cdot I_1^2 + \gamma \cdot I_1^3 +$$

$$\phi_2 = \alpha \cdot I_2 + \beta \cdot I_2^2 + \gamma \cdot I_2^3 +$$

where $I_1$, $I_2$ are electrical current values of the bias current that may be injected into respective bias diodes of the MZI, the coefficients $\alpha, \beta, \gamma$ are fitting parameters such that $\alpha \gg \beta \cdot I$ and $\alpha \gg \gamma \cdot I^2$, and contributions from terms that are higher order powers of the bias current (e.g., $I^4, I^5$, etc.) are negligibly small. Under this approximation, the induced difference in phase between the two arms can be expressed as $$\phi_1 - \phi_2 = (I_1 - I_2) \cdot [\alpha + \beta \cdot (I_1 + I_2) + \gamma \cdot \{(I_1 + I_2)^2 - I_1 \cdot I_2\}] +$$

with a factor that is directly proportional to the difference in bias currents ($I_1 - I_2$), and another factor that depends on the sum of bias currents ($I_1 + I_2$). The described embodiments provide for differential adjustment of bias currents, i.e., the adjustment of the difference of the bias currents, to the electro-optical modulator to achieve the bias point.

Figure 3:
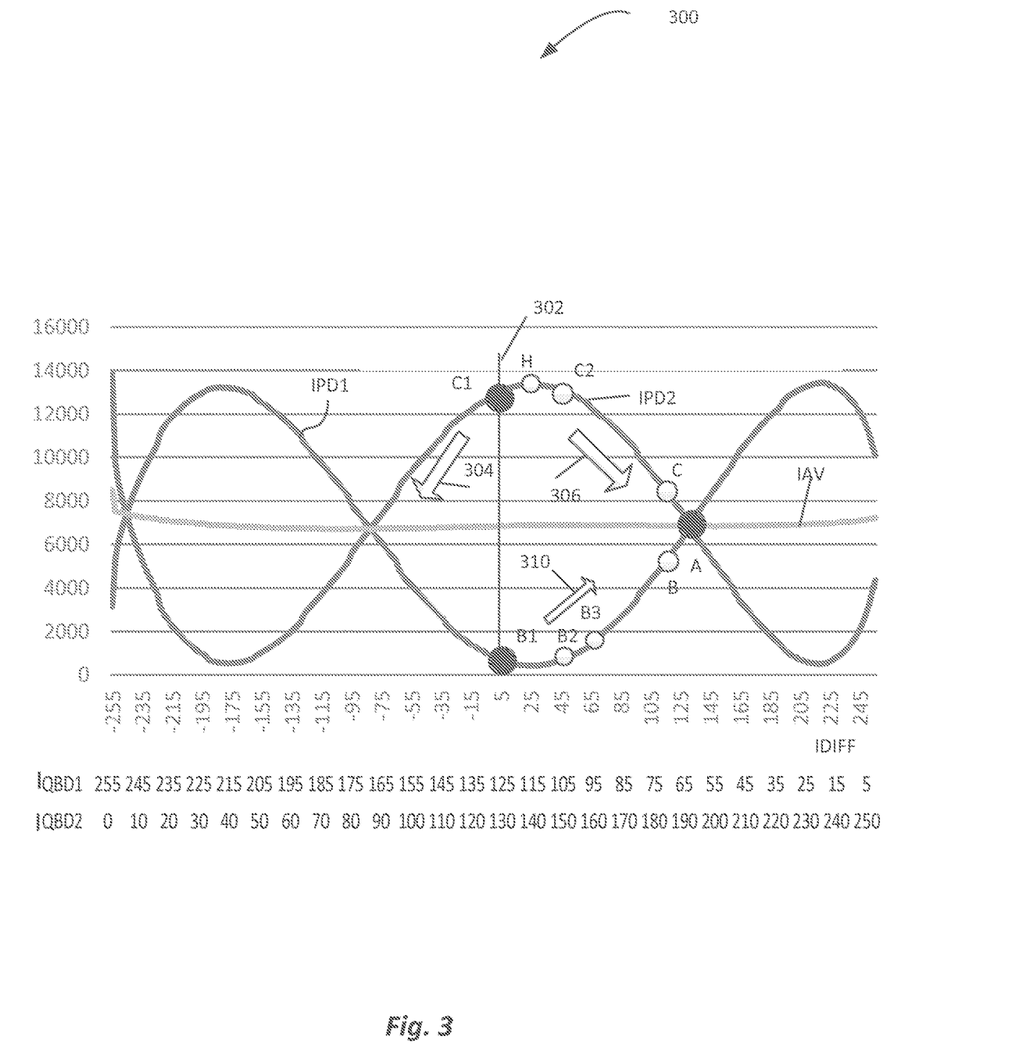
FIG. 3 is a graph illustrating photocurrent curves outputted by photodiodes of the apparatus of FIG. 2, in accordance with some embodiments.

FIG. 3 is a graph 300 illustrating photocurrent curves IPD1 and IPD2 (Y-axis) that may be outputted by photodiodes PD1 208 and PD2 288 (hereinafter PD1 and PD2) of the apparatus 200 of FIG. 2, in accordance with some embodiments. For clarity purposes, the description of FIG. 3 will reference the components of the apparatus 200 of FIG. 2. Values of IDIFF, representing the difference between bias currents 276 (hereinafter IQBD1) and 278 (hereinafter IQBD2) that may be injected in the bias diodes QBD1 216 and QBD2 218 of the arms of the MZI 112 such that IDIFF=(IQBD2−IQBD1), are shown along the X-axis, while the values of individual currents IQBD1 and IQBD2 are shown below the X-axis for reference purposes. Graph

300 further illustrates an average current (IAV) of currents IPD1 and IPD2 (e.g., algebraic sum of currents IPD1 and IPD2).

It will be understood that the values of currents are shown in FIG. 3 are exemplary and shown for illustration, and do not limit the present disclosure. In general, the units in which the X-axis and Y-axis may be calibrated may be different depending on implementation and are not shown in FIG. 3. It will be understood that X-axis may be resealed to a particular value of IREF or plotted as a phase corresponding to current, and Y-axis may be scaled to a particular value, e.g., normalized to 1, for example.

As described above, current values IPD1 and IPD2 provided by photodiodes PD1 and PD2 may correspond to tapped portions of optical power of the two outputs of the coupler 206, as shown in FIG. 2. Balance of currents outputted by photodiodes PD1 and PD2 may be illustrated as the points in the graph 400 where IPD1=IPD2, for example, indicated by point A. Due to reasons described above, there may be an initial phase offset, indicated, for example, by point B on IPD1 curve and corresponding point C on IPD2 curve.

In order to begin differential phase adjustment of optical power signals in the arms 114, 116 of the electro-optical modulator 112, bias currents may be generated according to differential bias adjustment techniques described in detail in reference to FIGS. 4-7. The generated bias currents may be provided to the electro-optical modulator 112. The corresponding values of currents IPD1 and IPD2 are designated in FIG. 3 by points B1 and C1, placed on the respective curves IPD1 and IPD2 along the line 302. The points B1 and C1 may be referred to as a mid-point, e.g., initial bias current condition from which the differential adjustment of phases in the arms of the electro-optical modulator 112 may begin.

It may not be known to what side of the curves IPD1 and IPD2 points B1 and C1 may belong (e.g., relative to the highest amplitude point H). In other words, B1 and C1 may belong to the right from point H (indicated by points B2 and C2) or to the left from point H (indicated by points B1 and C1). In order to determine a direction of differential adjustment of the bias currents (e.g., direction 304 or 306), the positions of the values B1 and C1 in the curves IPD1 and IPD2 may need to be established, using differential adjustment of the bias currents as described below. After the direction of adjustment is determined, the bias control module 140 may continue differential adjustment of the phases of the signals 256 and 258 using bias currents of determined values (described below), to reach and maintain the bias point (point A in FIG. 3).

In order to conduct differential adjustment of respective phases of the light portions passing through the arms of the electro-optical modulator 112, the bias currents IQBD1 and IQBD2 to be injected into the respective arms of the electro-optical modular may be determined according to the following considerations. A differential constraint may be imposed on IQBD1 and IQBD2: IQBD1+IQBD2=CONSTANT-δi, where CONSTANT may be an offset current corresponding to an output of a current source to provide a bias current (e.g., current source circuit 272) and δi may be zero of the smallest incremental resolution of the current source DAC. The offset current is graphically represented in FIG. 4 as the intercept of the dotted line with the X-axis and/or the Y-axis, where the dotted line represents the allowed IQBD1, IQDB2 pairs, and the X and Y axes represent the individual IQBD1, IQBD2 values.

Based on the above constraint, an index (IQBD_Index) may be assigned to allowed IQBD1, IQBD2 pairs: Sort (IQBD_Index)={Sort_Decrement(IQBD1), Sort_Increment (IQBD2)}, where IQBD_Index is a unique number sequentially assigned to the differentially constrained IQBD1, IQBD2 pairs, starting from the pair with one of IQBD1 or IQBD2 equal zero. For example, for the case of IQBD1, IQBD2 pairs in the graph of FIG. 3, IQBD_Index equals IDIFF+255.

Figure 4:
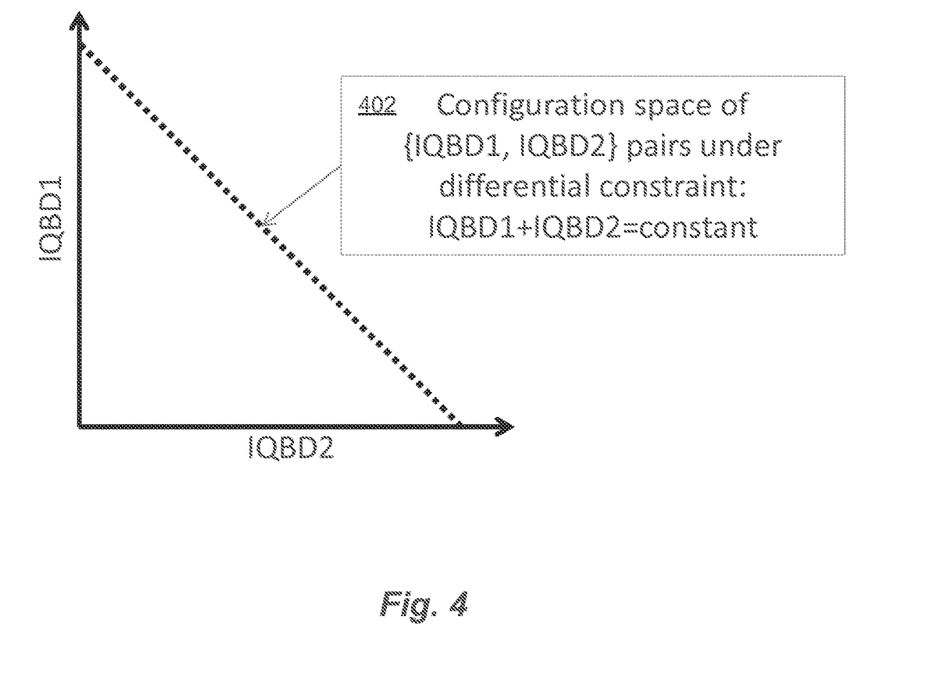
FIG. 4 is an example graph illustrating a configuration space of distribution of bias currents according to a differential constraint, in accordance with some embodiments.

FIG. 4 is an example graph illustrating a configuration space of distribution of IQBD1, IQBD2 pairs according to a differential constraint, in accordance with some embodiments. Under the differential adjustment mode provided according to the differential constraint illustrated in FIG. 4, the phase of the optical signal at the output of the electro-optical modulator 112 of FIG. 2 may be controlled by injecting current into the QBD1 216 and QBD2 218 of both arms 114 and 116 substantially simultaneously. The sum of the injected bias currents may be equal to the full scale output capability of one of the current sources 272 and 274 (assuming each of QBD1 and QBD2 is connected to identical independent current sources). In the differential adjustment mode, any increase in bias current in one arm may be accompanied by an equivalent decrease in bias current in the other arm, as shown by the bias current pair distribution 402.

For example, when bias currents are injected into respective arms of the electro-optical modulator in the differential adjustment mode, any change from the initial condition (e.g., mid-point B, C of FIG. 3) may involve a change of current in one arm and an equal (in magnitude) but negative change in current in the other arm. As a result, the phase change in each arm may be adjusted in opposite directions, and the net change in phase may effectively double. For example, +10 uA change in QBD1 along with a −10 uA change in QBD2 may effectively correspond to a −20 uA change in QB2 alone if QBD1 is left unchanged.

Figure 5:
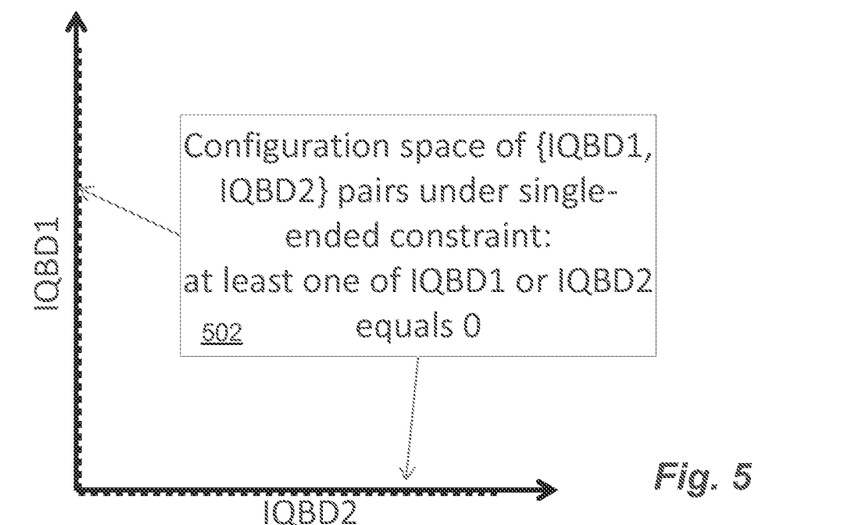
FIG. 5 is an example graph illustrating a configuration space of distribution of bias currents according to an embodiment of a differential constraint, such as a single-ended constraint, in accordance with some embodiments.

FIG. 5 is an example graph illustrating a configuration space of distribution of IQBD1, IQBD2 pairs according to a single-ended constraint, in accordance with some embodiments. In the single-ended adjustment mode of provision of bias currents IQBD1, IQBD2 corresponding to the single-ended constraint, the phase of the optical signal at the output of the electro-optical modulator may be controlled by injecting bias current into the bias diode QBD of one arm of the electro-optical modulator at a time, while the bias diode QBD for inactive arm may experience zero bias current, as shown by the bias current pair distribution 502.

Figure 6:
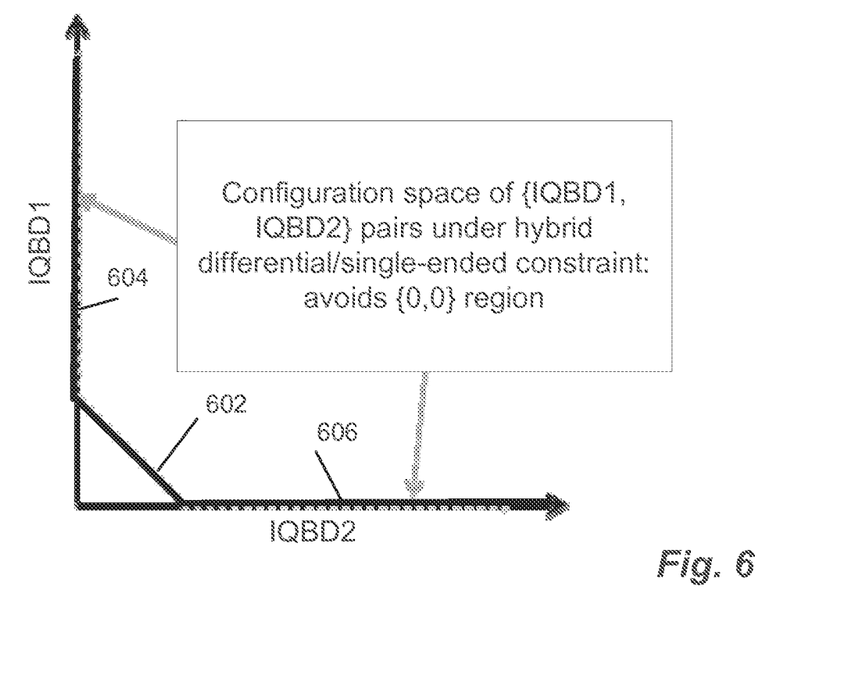
FIG. 6 is an example graph illustrating a configuration space of distribution of bias currents according to a hybrid differential/single-ended constraint, in accordance with some embodiments.

FIG. 6 is an example graph illustrating a configuration space of distribution of IQBD1, IQBD2 pairs according to a hybrid differential/single-ended constraint, in accordance with some embodiments. In the hybrid differential/single-ended adjustment mode of provision of bias currents IQBD1, IQBD2 corresponding to the hybrid differential/single-ended constraint, the phase of the optical signal at the output of the electro-optical modulator may be controlled over a subset 602 of the accessible range of bias currents based on a differential constraint. The sum of the injected bias currents may be a constant value, less than the full scale output of one of the current sources 272 or 274. The phase may be further controlled over the rest of the accessible range 604, 606, based on the single-ended constraint described above.

In summary, the differential constraint of provision of bias currents IQBD1, IQBD2 may be a sub-case of the hybrid constraint. The differential constraint may correspond to a region 602, in which the sum of the injected bias currents is equal to the full scale output capability of one of the current sources (and thus the single-ended mode is not invoked). The single-ended constraint may be another sub-case of the hybrid constraint where the differential constraint region corresponds to only one point in configuration space where the sum of the injected bias currents is equal to zero (and thus not invoked). For purposes of this disclosure, the differential adjustment mode corresponding to the differential constraint is described herein in greater detail.

Figure 7:
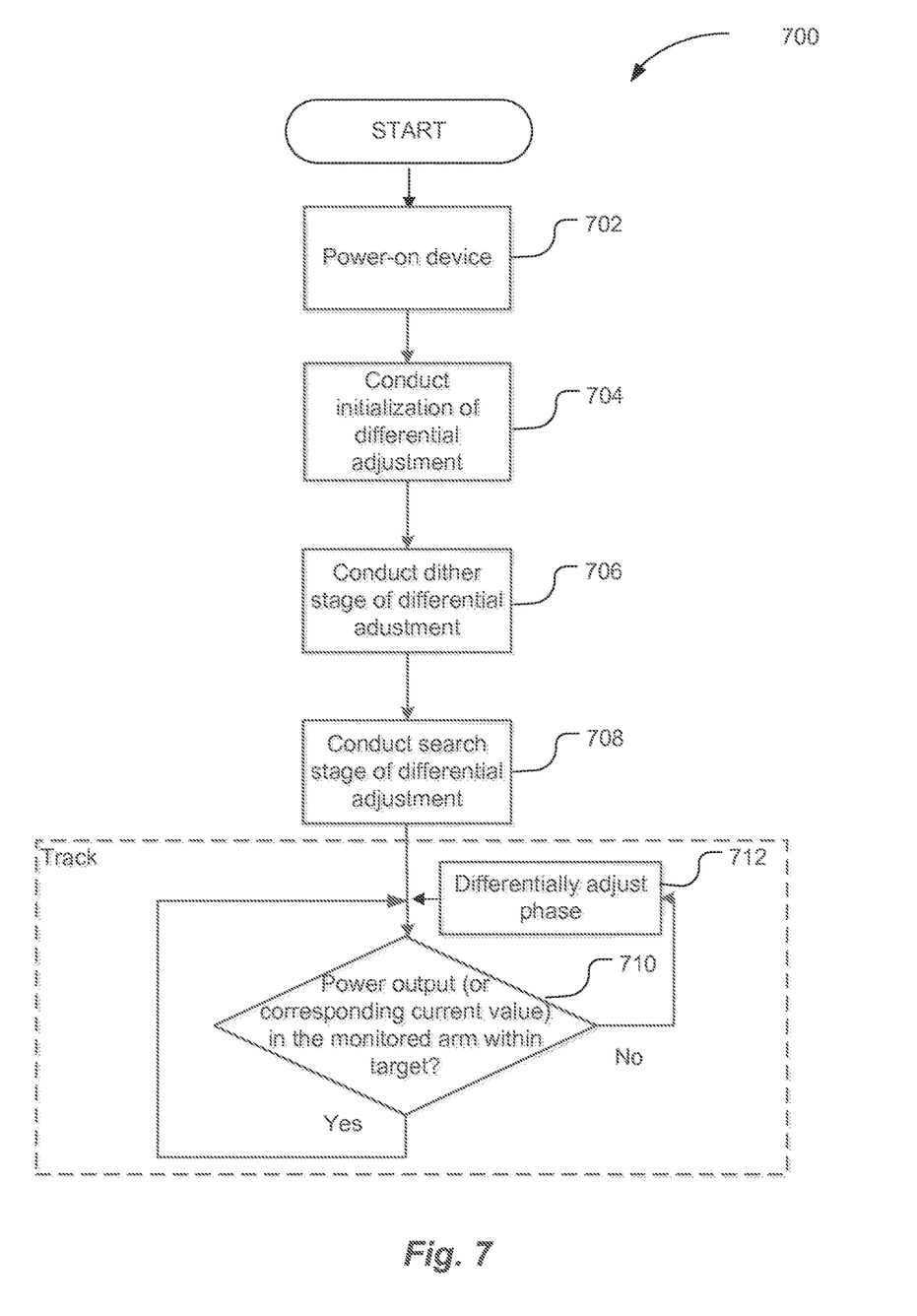
FIG. 7 is a process flow diagram for operation of an apparatus having an electro-optical modulator with a differential bias control and adjustment, in accordance with some embodiments.

FIG. 7 is a process flow diagram for operation of an apparatus having an electro-optical modulator with a differential bias control and adjustment, in accordance with some embodiments. The apparatus may comprise the apparatus 100 (200) with the electro-optical modulator (e,g., MZI) 112 coupled with the bias control module 140, which were described in reference to FIGS. 1-2. The operations described in reference to FIG. 7 may be performed by the control module 140 using the control loop 202, 222 described in reference to FIG. 2.

At block 702, the process 700 may include powering on the apparatus 200, and in particular the light source 108, which may provide light to the electro-optical modulator 112.

At block 704, the process 700 may include initializing differential phase adjustment by generating bias currents, e.g., in a differential adjustment mode. At initialization stage, the bias control module 140 may be configured to set IQBD_Index to a mid-point described in reference to FIG. 3. More specifically, the bias control module 140 may be configured to provide substantially equal bias current values IQBD1=IQBD2 to the respective arms of the electro-optical modulator 112, based on the differential constraint described in reference to FIG. 4. The initialization stage may be performed in order to begin differential adjustment of the bias currents, to achieve a bias point (e.g., point A in graph 300 of FIG. 3) in which the optical power of the light portions 256 and 258 may be balanced. In other words, the bias control module 140 may generate and provide substantially equal bias currents to the respective arms of the electro-optical modulator 112 in order to attain corresponding values of photocurrents IPD1 and IPD2 at mid-point (B1, C1) as shown in graph 300 of FIG. 3. As may be seen from example illustrated by graph 300 of FIG. 3, initializing bias current values may be about 125-130 microampere.

As discussed in reference to FIG. 3, a placement of the mid-point in the graphs depicting IPD1 and IPD2 may not be known at the initialization stage. Accordingly, at block 706, the control module 140 may be configured to conduct a dither stage of the differential phase adjustment, to determine a direction of differential adjustment. IQBD_Index may be repeatedly adjusted around its initial value corresponding to mid-point by ±n, where n may be a scaling parameter (e.g., n=full_scale/50). In other words, the bias currents may be adjusted around mid-point to determine whether corresponding change of IPD1 (or IPD2) traces a curve IPD1 (or IPD2) that is monotonically increasing, monotonically decreasing, concave or convex.

The control module 140 may increment the bias current IQBD1 and correspondingly decrement the bias current IQBD2 injected into the arms of the electro-optical modulator 112, and determine a corresponding power output of the first or second arm of the electro-optical modulator that is indicative of a respective phase of the first or second light portions (e.g., determine corresponding values of IPD1 or IPD2). For example, assuming the power output (and corresponding current IPD1) of the first arm is being monitored, the value of IPD1 corresponding to the increment of IQBD1 and decrement of IQBD2 may be illustrated by point B2 on the curve IPD1 in FIG. 3.

Subsequently, the control module 140 may increment the bias current IQBD2 and correspondingly decrement the bias current IQBD1 injected into the arms of the electro-optical modulator 112, and determine a power output indicative of the respective phase of the first or second light portions (e.g., corresponding value of IPD1 or IPD2). For example, the value of IPD1 corresponding to the increment of IQBD2 and decrement of IQBD1 may be illustrated by point B3 on the curve IPD1 in FIG. 3.

The control module 140 may identify a direction of increment and corresponding decrement of the bias currents to achieve the bias point, based on the determined power output (or corresponding photocurrent) values. This determination may be made based on the increment-decrement steps described above. For example, it may be determined that values of current IPD1 B2 and B3 determined as described above provide the monotonically increasing curve IPD1 in the direction of the bias point A. Accordingly, it may be determined that the direction B2-B3 indicated by arrow 310 may be the direction of differential adjustment aimed at achieving the bias point A.

At block 708, the process 700 may include conducting a search stage of the differential adjustment of phases of the light portions passing through the arms of the electro-optical modulator 240. In the search stage, the control module 140 may conduct differential adjustment in the direction identified at block 706. More specifically, the control module 140 may continuously increment or decrement IQBD_Index (e.g., increment bias current IQBD1 or IQBD2 and correspondingly decrement bias current IQBD2 or IQBD1) in the identified direction, and determine the power output indicative of the respective phase of the first or second light portions, until the power output reaches a target value (within a tolerance threshold). As described above, the increment of the bias current and corresponding decrement of another bias current may be performed substantially simultaneously.

For example, continuing with the assumption that IPD1 is being monitored, the following differential adjustment condition may be sought to be satisfied in response to continuous differential adjustment of the bias currents described above: |IPD1−Target|<Tolerance, wherein the Target value corresponds to the bias point, and the tolerance is a predetermined tolerance threshold. The Target value corresponding to the bias point may be determined by an a priori condition substantially independent of the applied currents IQBD1, IQBD2 to the bias diodes QBD1, QBD2, such as the target power output of the electro-optical modulator, set by laser bias, or by an equivalent dynamic condition that depends on the applied currents to the bias diodes, such IPD of the other arm. For example, since monitored output power is equal to (IPD1+IPD2), and since at the desired bias point IPD1=IPD2=½·(IPD1+IPD2), then setting the target output power of the electro-optical modulator as half the monitored output power is also equivalent to setting the target and condition as |IPD1−IPD2|<2·Tolerance.

At blocks 710 and 712, the process 700 may include tracking the bias point and adjustment of the phases in case of deviation from the bias point above the tolerance threshold. More specifically, at decision block 710 the control module 140 may determine (continuously or periodically) whether the above-described differential adjustment condition is satisfied. If the condition is determined to be satisfied, the condition check may continue (e.g., after a determined time period or continuously). If the condition is determined to no longer be satisfied, appropriate differential adjustment may be performed at block 712, after which the process may return to block 710 to check whether differential adjustment condition is satisfied after the action of block 712 is performed.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Figure 8:
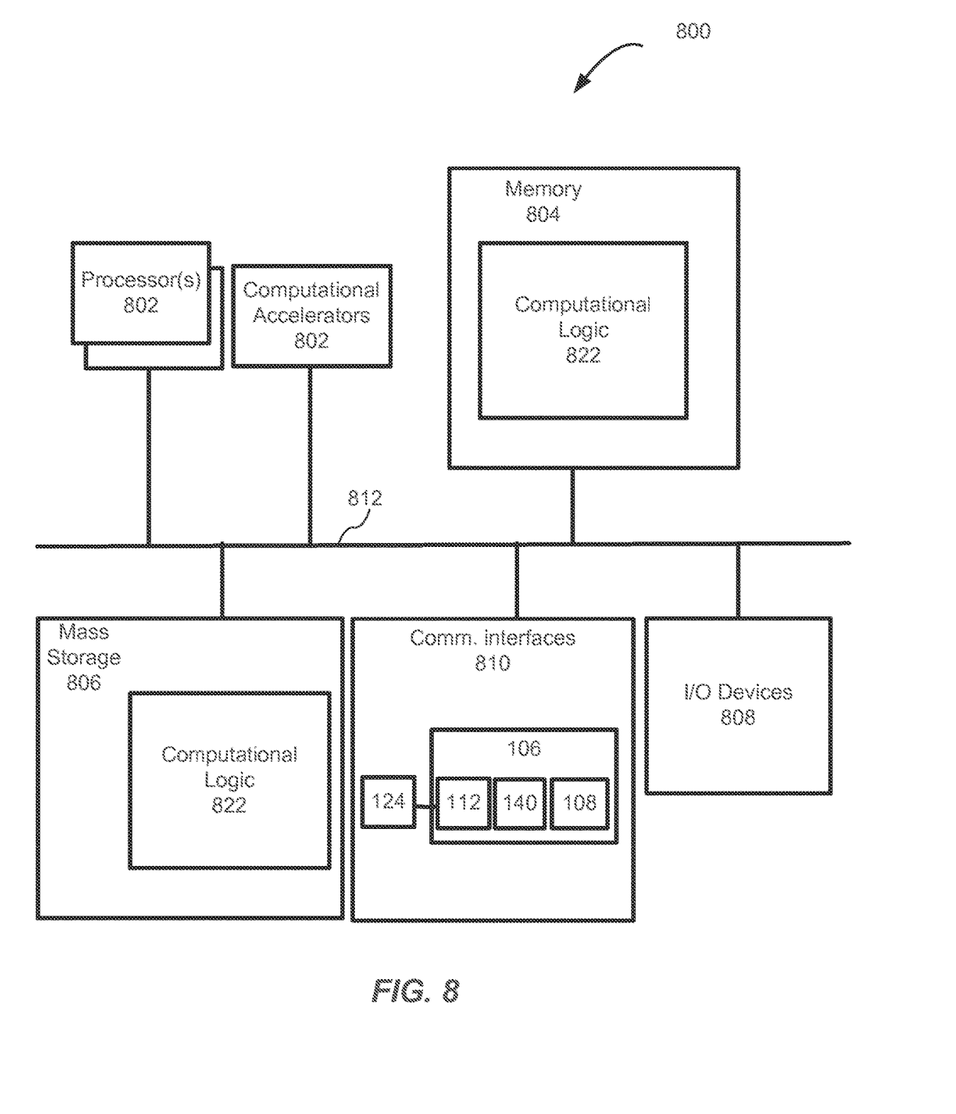
FIG. 8 is an example computing device suitable for use with various components of apparatuses of FIGS. 1-2, in accordance with some embodiments.

FIG. 8 is an example computing device 800 suitable for use with various components of apparatuses of FIGS. 1-2, in accordance with some embodiments. In some embodiments, example computing device 800 may include various components of apparatus 100, e.g., transmitter 106 including the electro-optical modulator 112, bias control module 140, and light source 108, as well as driver 124 described in reference to FIGS. 1-2. The example computing device 800 with the above components of apparatus 100 may be used in the field of optical communications, telecommunications and data communications, e.g., high speed communications such as Internet data transmission, intra-CPU communications, and the like.

As shown, computing device 800 may include one or more processors or processor cores 802, computational accelerators 803, and system memory 804. For the purpose of this application, including the claims, the terms "processor" and "processor cores" may be considered synonymous, unless the context clearly requires otherwise. The processor 802 may include any type of processors, such as a central processing unit (CPU), a microprocessor, and the like. The processor 802 may be implemented as an integrated circuit having multi-cores, e.g., a multi-core microprocessor. Computational accelerators 803 may include but are not limited to highly parallel floating point processors such as graphics processor units (GPU), digital signal processors (DSP), field programmable gate arrays (FPGA). The computing device 800 may include mass storage devices 806 (such as diskette, hard drive, non-volatile solid state memory, volatile memory (e.g., dynamic random-access memory (DRAM), compact disc read-only memory (CD-ROM), digital versatile disk (DVD), and so forth)). In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 800 may further include input/output (I/O) devices 808 (such as a display (e.g., a touchscreen display), keyboard, cursor control, remote control, gaming controller, image capture device, and so forth) and communication interfaces 810 (such as network interface cards, optical apparatuses, modems, infrared receivers, radio receivers (e.g., Bluetooth), and so forth). In some embodiments, the communication interfaces 810 may include at least some components referenced in FIG. 1, such as transmitter 106 including the electro-optical modulator 112, bias control module 140, and light source 108, implementing aspects of the embodiments described above, in addition to receiver element not shown. The computing device 800 having the transmitter 106 may be configured to operate in high-speed or low-speed data communications environment.

The communication interfaces 810 may include communication chips (not shown) that may be configured to operate the computing device 800 in accordance with data communications protocols such as Ethernet (IEEE Standard 802), Peripheral Component Interconnect Express (PCIe), Fibre Channel (ANSI INCITS 512), InfiniBand, a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 810 may operate in accordance with other wireless protocols in other embodiments.

The above-described computing device 800 elements may be coupled to each other via system bus 812, which may represent one or more buses. In the case of multiple buses, they may be bridged by one or more bus bridges (not shown). Each of these elements may perform its conventional functions known in the art. In particular, system memory 804 and mass storage devices 806 may be employed to store a working copy and a permanent copy of programming instructions implementing, e.g., an operation system, and one or more applications (of any kind), generally denoted as computational logic 822. The various elements may be implemented by assembler instructions supported by processor(s) 802 or high-level languages that may be compiled into such instructions.

The permanent copy of the programming instructions may be placed into permanent storage devices 806 in the factory, or in the field through, for example, a distribution medium (not shown), such as a compact disc (CD), or through communication interface 810 (from a distribution server (not shown)). That is, one or more distribution media having an implementation of the agent program may be employed to distribute the agent and to program various computing devices.

The number, capability, and/or capacity of the elements 808, 810, 812 may vary, depending on whether computing device 800 is used as a stationary computing device, such as a set-top box or desktop computer (e.g., a server), or a mobile computing device, such as a tablet computing device, laptop computer, game console, or smartphone. Their constitutions are otherwise known, and accordingly will not be further described.

In various implementations, the computing device 800 may comprise one or more components of a data center including configurations where the communication interface 810 containing transmitter 100 is used to link multiple computing devices 800, a laptop, a netbook, a notebook, an ultrabook, a smartphone, a tablet, a personal digital assistant (PDA), an ultra mobile PC, a mobile phone, or a digital camera. In further implementations, the computing device 800 may be any other electronic device that processes data.

The following paragraphs describe examples of various embodiments.

Example 1 is an apparatus for controlling an output of an electro-optical modulator, comprising: an electro-optical modulator having first and second arms, to modulate light passing through the first and second arms in response to an input data signal, and output a corresponding optical data signal; and a control module coupled with the electro-optical modulator, to differentially adjust respective phases of first or second light portions passing through the first and second arms, to achieve a bias point for the optical data signal, wherein the bias point defines a desired power output of the apparatus that corresponds to the optical data signal.

Example 2 may include the subject matter of Example 1, wherein the control module to differentially adjust respective phases of first or second light portions includes to, at power-on, inject into the first and second arms a first bias current and a second bias current respectively, to begin the differential adjustment of the phases of the first or second light portions, wherein the first bias current is approximately equal the second bias current.

Example 3 may include the subject matter of Example 2, wherein the control module to differentially adjust respective phases of first or second light portions further includes to: increment the first bias current and correspondingly decrement the second bias current injected into the first and second arms respectively, and determine a first value of at least one of a power output of the first or second arm of the electro-optical modulator that is indicative of a respective phase of the first or second light portions, in response to the increment of the first bias current and the corresponding decrement of the second bias current; increment the second bias current and correspondingly decrement the first bias current injected into the first and second arms respectively, and determine a second value of the power output indicative of the respective phase of the first or second light portions, in response to the decrement of the first bias current and the corresponding increment of the second bias current; and identify a direction of increment of the first or second bias current and corresponding decrement of the second or first bias current to achieve the bias point, based at least in part on the first and second values.

Example 4 may include the subject matter of Example 3, wherein the control module to differentially adjust respective phases of first or second light portions further includes to: increment the first or second bias current and correspondingly decrement the second or first bias current in the identified direction, and determine the power output indicative of the respective phase of the first or second light portions until the power output reaches a target value within a tolerance threshold, wherein the target value corresponds to the bias point.

Example 5 may include the subject matter of Example 4, wherein the control module is to increment the first or second bias current and correspondingly decrement the second or first bias current substantially simultaneously.

Example 6 may include the subject matter of Example 4, wherein the control module is to increment the first or second bias current and correspondingly decrement the second or first bias current to maintain a sum of the first and second bias currents approximately equal to or less than an offset bias current associated with the apparatus, wherein the offset bias current corresponds to an output of a current source to provide a first or second bias current.

Example 7 may include the subject matter of Example 4, wherein the control module includes a converter that includes: a photo detector, to receive a current value corresponding to a first or second power output that corresponds the first and second light portions, and to generate a voltage signal that corresponds to the first or second power output, based on the current value; an amplifier coupled with the photo detector, to amplify the voltage signal above a voltage sense threshold; and a microcontroller coupled with the photo detector to sense the voltage signal above the voltage sense threshold, and generate values for the first and second bias currents to inject into the first and second arms, in response to the receipt of the voltage signal.

Example 8 may include the subject matter of Example 7, wherein the photo detector comprises a photodiode to generate a current signal corresponding to the power output and an amplifier coupled with the photodiode to convert the current signal into the voltage signal.

Example 9 may include the subject matter of Example 7, wherein the control module includes: a current source circuit coupled with the electro-optical modulator, wherein the current source circuit includes first and second current sources to provide the first and second bias currents to the first and second arms.

Example 10 may include the subject matter of Example 9, wherein the current source circuit further includes first and second bias diodes coupled with the first and second arms respectively, to inject the bias current into the first and second arms.

Example 11 may include the subject matter of any of Examples 1 to 10, further comprising a laser coupled with the electro-optical modulator to provide light into the first and second arms of the electro-optical modulator.

Example 12 may include the subject matter of Example 11, wherein the electro-optical modulator is a Mach-Zehnder interferometer.

Example 13 may include the subject matter of Example 12, further comprising first and second optical paths to optically couple the converter with the first and second photodiodes, wherein the Mach-Zehnder interferometer, the converter, the first and second photodiodes, and the first and second optical paths are integrated in a chip comprising a semiconductor material.

Example 14 may include the subject matter of Example 1, wherein the apparatus is a computing device, and wherein the optical data signal comprises data to be transmitted by the computing device, based on the input data signal provided to the first and second arms of the electro-optical modulator.

Example 15 is a computer-implemented method for controlling an output of an electro-optical modulator, comprising: determining, by a controller coupled with the electro-optical modulator, a power output of a first or second arm of the electro-optical modulator; and in response to the determining, adjusting, by the controller, a first bias current to be injected into the first arm of the electro-optical modulator; and correspondingly adjusting, by the controller, a second bias current to be injected into the second arm of the electro-optical modulator, wherein adjusting the first and second bias currents includes maintaining a sum of the first and second bias currents approximately equal to or less than an offset bias current.

Example 16 may include the subject matter of Example 15, further comprising: determining, by the controller, whether the power output reached a target value within a tolerance threshold, wherein the target value corresponds to a bias point associated with the electro-optical modulator, wherein adjusting a first bias current and correspondingly adjusting a second bias current includes: incrementing, by the controller, the first or second bias current, and correspondingly decrementing, by the controller, the second or first bias current, based at least in part on a result of the determining whether the power output reached the target value within the tolerance threshold.

Example 17 may include the subject matter of Example 16, wherein incrementing and correspondingly decrementing includes incrementing, by the controller, the first or second bias current, and correspondingly decrementing, by the controller, the second or first bias current substantially simultaneously.

Example 18 may include the subject matter of Example 16 or 17, further comprising: identifying, by the controller, a direction of incrementing the first or second bias current and corresponding decrementing the second or first bias current to achieve the bias point.

Example 19 is a non-transitory computing device-readable media having instructions for controlling output of an electro-optical modulator stored thereon that, in response to execution on the computing device, cause the computing device to: determine a power output of a first or second arm of the electro-optical modulator; and in response to the determination, adjust a first bias current to be injected into the first arm of the electro-optical modulator; and correspondingly adjust a second bias current to be injected into the second arm of the electro-optical modulator, wherein adjustment of the first and second bias currents includes to maintain a sum of the first and second bias currents approximately equal to or less than an offset bias current.

Example 20 may include the subject matter of Example 19, wherein the instructions further cause the computing device to: determine whether the power output reached a target value within a tolerance threshold, wherein the target value corresponds to a bias point associated with the electro-optical modulator; and increment the first or second bias current, and correspondingly decrement the second or first bias current, based at least in part on a result of the determining whether the power output reached the target value within the tolerance threshold.

Example 21 may include the subject matter of Example 20, wherein the instructions further cause the computing device to increment the first or second bias current, and correspondingly decrement the second or first bias current substantially simultaneously.

Example 22 may include the subject matter of Example 20 or 21, wherein the instructions further cause the computing device to identify a direction of increment of the first or second bias current and corresponding decrement of the second or first bias current to achieve the bias point.

Example 23 may include the subject matter of Example 20, wherein the electro-optical modulator is a Mach-Zehnder interferometer coupled with the computing device.

Example 24 is an apparatus for controlling an output of an electro-optical modulator, comprising: means for determining a power output of a first or second arm of the electro-optical modulator; means for adjusting, in response to the determining, a first bias current to be injected into the first arm of the electro-optical modulator; and means for correspondingly adjusting a second bias current to be injected into the second arm of the electro-optical modulator, wherein adjusting the first and second bias currents includes maintaining a sum of the first and second bias currents approximately equal to or less than an offset bias current.

Example 25 may include the subject matter of Example 24, further comprising: means for determining whether the power output reached a target value within a tolerance threshold, wherein the target value corresponds to a bias point associated with the electro-optical modulator, wherein means for adjusting a first bias current and correspondingly adjusting a second bias current includes: means for incrementing the first or second bias current, and correspondingly decrementing the second or first bias current, based at least in part on a result of the determining whether the power output reached the target value within the tolerance threshold.

Example 26 may include the subject matter of Example 25, wherein means for incrementing and correspondingly decrementing includes means for incrementing the first or second bias current, and means for correspondingly decrementing the second or first bias current substantially simultaneously.

Example 27 may include the subject matter of Example 25 or 26, further comprising: means for identifying a direction of incrementing the first or second bias current and corresponding decrementing the second or first bias current to achieve the bias point.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An apparatus for controlling an output of an electro-optical modulator, comprising:
   the electro-optical modulator having first and second arms, to modulate light passing through the first and second arms in response to an input data signal, and output a corresponding optical data signal; and
   a control module coupled with the electro-optical modulator, to differentially adjust respective phases of first or second light portions passing through the first and second arms, to achieve a bias point for the optical data signal, wherein the bias point defines a desired power output of the apparatus that corresponds to the optical data signal, wherein the control module, at power-on, is to: inject into the first and second arms a first bias current and a second bias current respectively, to begin the differential adjustment of the phases of the first or second light portions, wherein the first bias current is approximately equal the second bias current, wherein the control module is further to:
   increment the first bias current and correspondingly decrement the second bias current injected into the first and second arms respectively, and determine a first value of at least one of a power output of the first or second arm of the electro-optical modulator that is indicative of a respective phase of the first or second light portions, in response to the increment of the first bias current and the corresponding decrement of the second bias current;
   increment the second bias current and correspondingly decrement the first bias current injected into the first and second arms respectively, and determine a second value of the power output indicative of the respective phase of the first or second light portions, in response to the decrement of the first bias current and the corresponding increment of the second bias current; and identify a direction of increment of the first or second bias current and corresponding decrement of the second or first bias current to achieve the bias point, based at least in part on the first and second values.

2. The apparatus of claim 1, wherein the control module to differentially adjust respective phases of first or second light portions further includes to:

increment the first or second bias current and correspondingly decrement the second or first bias current in the identified direction, and determine the power output indicative of the respective phase of the first or second light portions until the power output reaches a target value within a tolerance threshold, wherein the target value corresponds to the bias point.

3. The apparatus of claim 2, wherein the control module is to increment the first or second bias current and correspondingly decrement the second or first bias current substantially simultaneously.

4. The apparatus of claim 2, wherein the control module is to increment the first or second bias current and correspondingly decrement the second or first bias current to maintain a sum of the first and second bias currents approximately equal to or less than an offset bias current associated with the apparatus, wherein the offset bias current corresponds to an output of a current source to provide a first or second bias current.

5. The apparatus of claim 2, wherein the control module includes a converter that includes:

a photo detector, to receive a current value corresponding to a first or second power output that corresponds to the first and second light portions, and to generate a voltage signal that corresponds to the first or second power output, based on the current value;

an amplifier coupled with the photo detector, to amplify the voltage signal above a voltage sense threshold; and a microcontroller coupled with the photo detector to sense the voltage signal above the voltage sense threshold, and generate values for the first and second bias currents to inject into the first and second arms, in response to the receipt of the voltage signal.

6. The apparatus of claim 5, wherein the photo detector comprises a photodiode to generate a current signal corresponding to the power output and an amplifier coupled with the photodiode to convert the current signal into the voltage signal.

7. The apparatus of claim 5, wherein the control module includes:

a current source circuit coupled with the electro-optical modulator, wherein the current source circuit includes first and second current sources to provide the first and second bias currents to the first and second arms.

8. The apparatus of claim 7, wherein the current source circuit further includes first and second bias diodes coupled with the first and second arms respectively, to inject the bias current into the first and second arms.

9. The apparatus of claim 1, further comprising a laser coupled with the electro-optical modulator to provide light into the first and second arms of the electro-optical modulator.

10. The apparatus of claim 9, wherein the electro-optical modulator is a Mach-Zehnder interferometer.

11. The apparatus of claim 10, further comprising first and second optical paths to optically couple a converter with first and second photodiodes, wherein the Mach-Zehnder interferometer, the converter, the first and second photodiodes, and the first and second optical paths are integrated in a chip comprising a semiconductor material.

12. The apparatus of claim 1, wherein the apparatus is a computing device, and wherein the optical data signal comprises data to be transmitted by the computing device, based on the input data signal provided to the first and second arms of the electro-optical modulator.

13. A computer-implemented method for controlling an output of an electro-optical modulator, comprising:

determining, by a controller coupled with the electro-optical modulator, a power output of a first or second arm of the electro-optical modulator; and in response to the determining, adjusting, by the controller, a first bias current to be injected into the first arm of the electro-optical modulator;

correspondingly adjusting, by the controller, a second bias current to be injected into the second arm of the electro-optical modulator; and determining, by the controller, whether the power output reached a target value within a tolerance threshold, wherein the target value corresponds to a bias point associated with the electro-optical modulator, wherein adjusting the first and second bias currents includes:

incrementing the first or second bias current, and correspondingly decrementing the second or first bias current, based at least in part on a result of the determining whether the power output reached the target value within the tolerance threshold; and maintaining a sum of the first and second bias currents approximately equal to or less than an offset bias current.

14. The computer-implemented method of claim 13, wherein incrementing and correspondingly decrementing includes incrementing, by the controller, the first or second bias current, and correspondingly decrementing, by the controller, the second or first bias current substantially simultaneously.

15. The computer-implemented method of claim 13, further comprising: identifying, by the controller, a direction of incrementing the first or second bias current and correspondingly decrementing the second or first bias current to achieve the bias point.

16. A non-transitory computing device-readable media having instructions for controlling output of an electro-optical modulator stored thereon that, in response to execution on the computing device, cause the computing device to:

determine a power output of a first or second arm of the electro-optical modulator; and in response to the determination, adjust a first bias current to be injected into the first arm of the electro-optical modulator;

correspondingly adjust a second bias current to be injected into the second arm of the electro-optical modulator;

determine whether the power output reached a target value within a tolerance threshold, wherein the target value corresponds to a bias point associated with the electro-optical modulator; and increment the first or second bias current, and correspondingly decrement the second or first bias current, based at least in part on a result of the determining whether the power output reached the target value within the tolerance threshold, wherein adjustment of the first and second bias currents includes to maintain a sum of the first and second bias currents approximately equal to or less than an offset bias current.

17. The non-transitory computing device-readable media of claim 16, wherein the instructions further cause the computing device to increment the first or second bias current, and correspondingly decrement the second or first bias current substantially simultaneously.

18. The non-transitory computing device-readable media of claim 16, wherein the instructions further cause the computing device to identify a direction of increment of the first or second bias current and corresponding decrement of the second or first bias current to achieve the bias point.

19. The non-transitory computing device-readable media of claim 16, wherein the electro-optical modulator is a Mach-Zehnder interferometer coupled with the computing device.

* * * * *